March 3, 1953 — G. G. CHEW — 2,629,965
FISHHOOK HOLDER
Filed Sept. 21, 1950
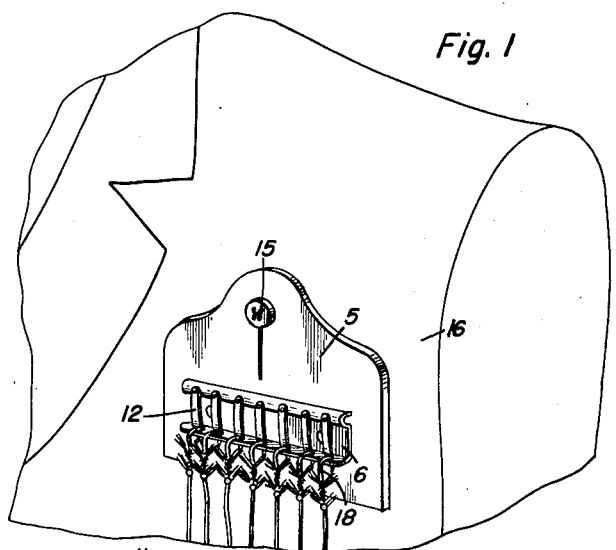
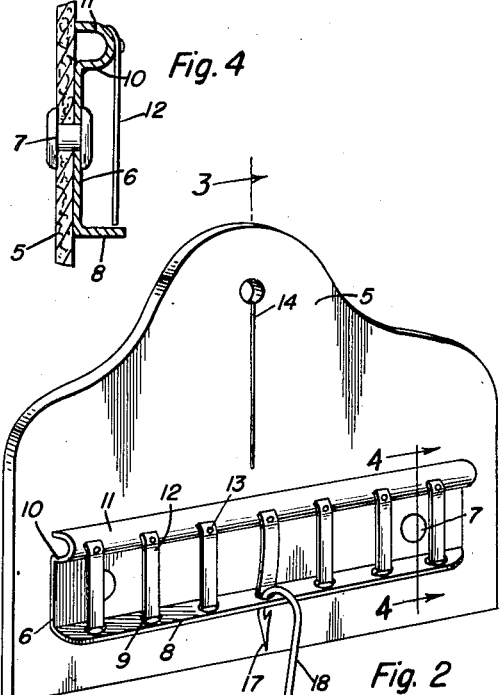
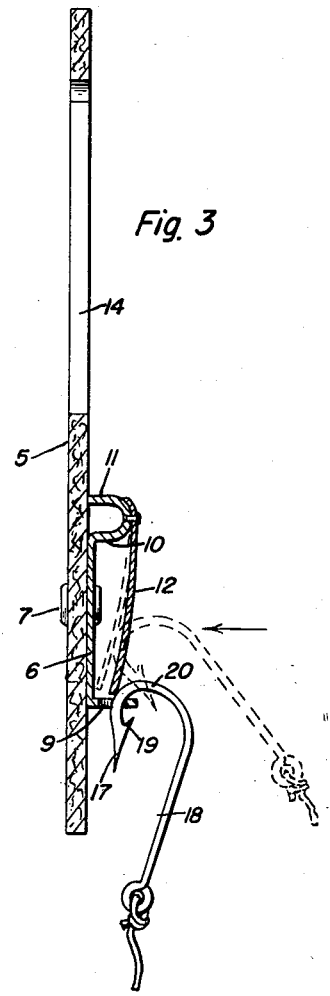
Gayel G. Chew
INVENTOR.

Patented Mar. 3, 1953

2,629,965

UNITED STATES PATENT OFFICE 2,629,965

FISHHOOK HOLDER

Gayel G. Chew, Reno, Nev., assignor of thirty-three and one-third per cent to Mark M. Chew Application September 21, 1950, Serial No. 185,975

1 Claim. (Cl. 43—57.5)

1

The present invention relates to new and useful improvements in holders for snelled fish hooks or flies embodying means whereby a number of the hooks may be conveniently carried in an easily accessible position and without danger of the barbs becoming entangled.

An important object of the invention is to provide a fish hook holder which may be attached to a person's garment to carry the fish hooks within convenient reach.

Another object is to provide a device of this character of simple and practical construction, which is efficient and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is an enlarged perspective view showing the holder detached from the garment;

Figure 3 is a vertical sectional view taken on the line 3—3 of Figure 2; and

Figure 4 is an enlarged fragmentary vertical sectional view taken on the line 4—4 of Figure 2.

Referring now to the drawing in detail wherein for the purpose of illustration I have disclosed a preferred embodiment of the invention the numeral 5 designates a backing plate which may be constructed of leather or other suitable material and to which a channel shaped hook carrying member 6 of metal or other suitable rigid material is attached by means of rivets or the like 7.

Hook carrying member 6 includes a lower forwardly projecting flange 8 having openings 9 therein and an upper forwardly projecting flange 10 preferably formed as a rolled edge channel 11.

A plurality of springs 12 of strap metal are secured at their upper edges to the forwardly projecting channel 11 by rivets or the like 13 and with the lower ends of the springs positioned immediately above the openings 9.

The upper portion of backing plate 5 is formed with a slit 14 forming a buttonhole and by means of which the backing plate may be supported on a button 15 attached to a coat or other garment 16.

In the operation of the device with the backing plate 5 attached to the garment in the manner as illustrated in Figure 1 of the drawings the points 17 of fish hooks 18 are inserted downwardly through the openings 9 by pressing the springs 12 rearwardly in the manner as indicated by the dotted lines in Figure 3 of the

2 drawing to position the barbs 19 of the hooks under the lower flange 8. The lower ends of springs 12 engage the bill portions 20 of the hooks to hold the same in the openings and to prevent accidental removal therefrom as well as to protect the barbs of the hooks from becoming entangled with the garment or with other objects. The springs 12 depend from the channel 11 so that the lower ends thereof are in alignment with the openings 9 of the flange 8.

The hooks may be easily removed by pressing the same rearwardly against the springs 12 and then lifting the hooks upwardly out of the openings.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A holder for fish hooks provided with a backing plate and means for attaching it to the garment of a person, said backing plate having secured thereto a hook carrying member provided with a channel projection along its upper edge and a flange along its lower edge, said flange having one or more openings therein, spring means positioned in alignment with each of said openings and depending from said channel projection, said spring means being normally straight and adapted to be biased from such straight condition by the bill of a hook extending through the opening with its barb beneath the flange, whereby the spring is adapted to engage the bill of the hook to retain it on the flange.

GAYEL G. CHEW.

REFERENCES CITED

The following references are of record in the file of this patent:

UNITED STATES PATENTS

| Number | Name | Date |
|---|---|---|
| 124,445 | McCool | Mar. 12, 1872 |
| 586,238 | King | July 13, 1897 |
| 1,357,041 | Fritch | Oct. 26, 1920 |
| 1,901,166 | Jordan | Mar. 14, 1933 |
| 2,164,259 | Schweigert | June 27, 1939 |
| 2,173,363 | Hillmer | Sept. 19, 1939 |
| 2,415,637 | Jones | Feb. 11, 1947 |